Patented Apr. 22, 1952

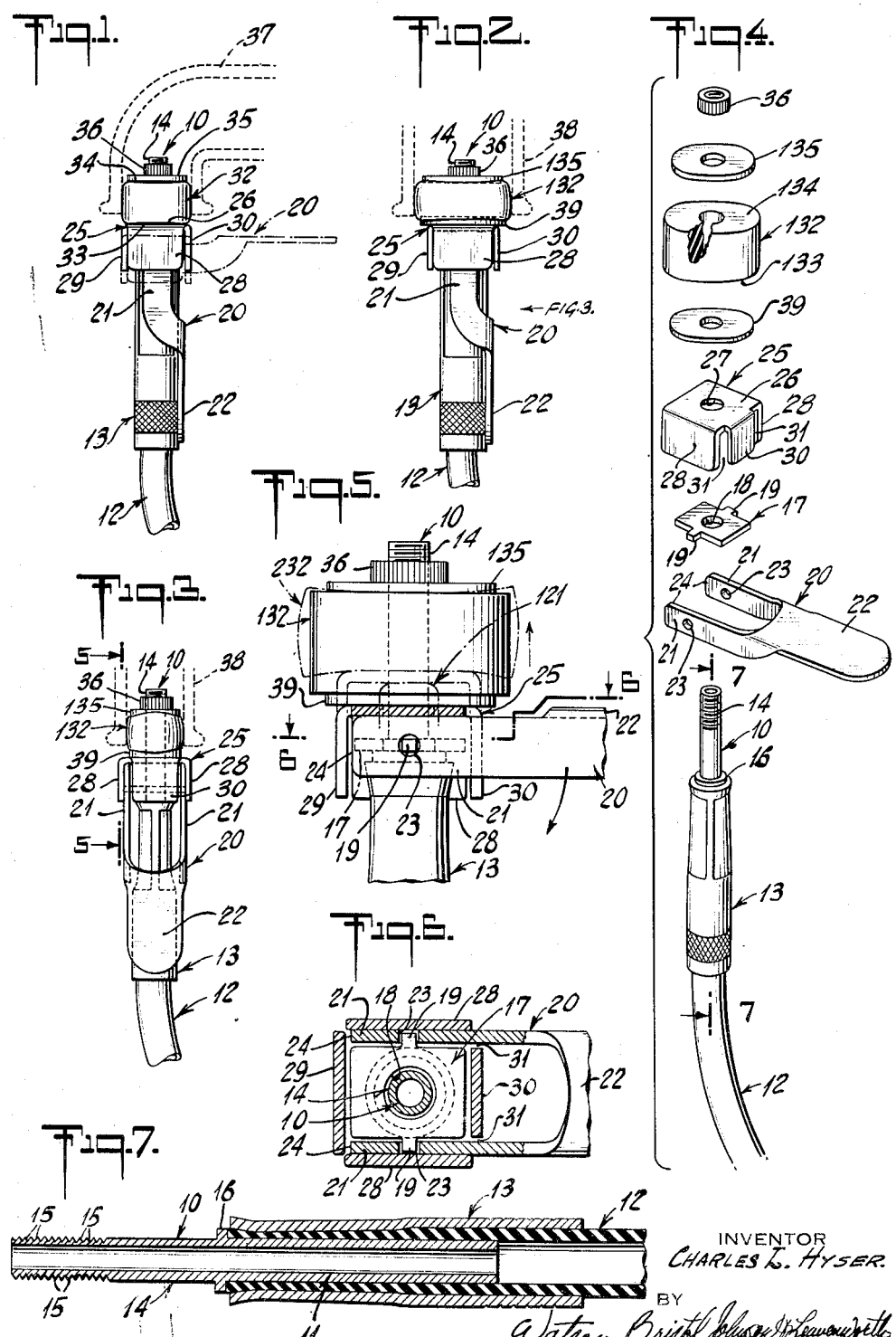

2,593,454

UNITED STATES PATENT OFFICE 2,593,454

HOSE ATTACHMENT FOR FAUCET OUTLETS AND THE LIKE

Charles L. Hyser, Bronxville, N. Y., assignor to Orajet Corporation, Wilmington, Del., a corporation of Delaware Application August 17, 1949, Serial No. 110,730

6 Claims. (Cl. 285—165)

The present invention relates to hose attaching devices, more particularly adapted to anchorage of flexible hoses to faucets and similar liquid outlets.

A general object of the present invention is to provide such a hose attaching device which is of a minimum number of parts and of very simple construction making possible economical mass production thereof while requiring a minimum of machine and assembling operations, the parts being chiefly held together by a single anchoring means or elements; and with suitable means employed in a simple manner effectively to hold in the assembled device its operating lever securely upon its pivoting structure without necessitating complicated fabricating procedures, such as peening or the like.

A more specific object of the present invention is to provide such a device in the nature of an expansible gasket sleeve device associated with a cam lever to swell the same into anchoring position in a liquid outlet, most of the parts being slidably received on a nipple tube between a pair of relatively fixed abutment means with one comprising a threaded nut whereby the latter effectively holds together all the parts, some of which include pivotal mounting means for the cam lever and guard means located laterally thereof to hold the lever on its pivotal mount, the structure thus being easily assembled in a rapid and simple manner requiring no particular skill.

A further object of the present invention is to provide such a hose anchoring device which is usable to advantage with various types of bathroom accessories, for example, the apparatus described and claimed in my copending application Serial No. 49,711, filed September 17, 1948, now Patent No. 2,550,565, entitled, "Dental Fountain Cleaner."

An additional object of the present invention is to provide structural embodiments thereof which, while being readily constructed, allow efficient use and operation.

Other objects of the invention will in part be obvious and will in part appear hereinafter.

The invention accordingly comprises the features of construction, combination of elements and arrangements of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is a side elevational view of an embodiment of the present invention anchored in a circular faucet or spigot outlet indicated in dotted lines, a portion of the anchored hose being broken away and the freeing position of the cam lever being indicated in dot-dash lines;

Fig. 2 is a view similar to Fig. 1 showing another embodiment of the device differing chiefly in the shape of the gasket sleeve to adapt it to a fitting or faucet having other than a circular outlet;

Fig. 3 is a view similar to Fig. 2 of the structure shown therein, but taken in a plane at right angles to the plane of view of Fig. 2;

Fig. 4 is an exploded side elevational view of the structure shown in Figs. 2 and 3, with the parts separated in their unassembled positions, and with some broken away for clarification;

Fig. 5 is an enlarged side elevational view, with parts in section and broken away, indicating in detail certain features of the device shown in Figs. 2, 3 and 4, and taken substantially on line 5—5 of Fig. 3, but showing its operating cam lever in the non-anchoring position;

Fig. 6 is a sectional view taken substantially on line 6—6 of Fig. 5; and

Fig. 7 is an enlarged longitudinal section taken substantially on line 7—7 of Fig. 4.

Referring to the drawing, wherein similar parts bear like numerals throughout, it will be seen that an embodiment of the present invention may comprise a nipple tube 10 having one end portion 11 suitably anchored within a hose 12 of flexible material, such as rubber or plastic, by means of a shrunken sleeve 13. The other end portion 14 of nipple tube 10 is suitably provided with external threads 15—15. Preferably, nipple tube 10 is provided intermediate the end portions 11 and 14 thereof with any suitable laterally-extending abutment means, for example, a ring secured thereto or an integral circular ledge or rib 16, to provide a limiting stop determining the position of parts slid down over the outer nipple tube portion 14.

As best seen in Figs. 4 and 6, base plate 17 preferably is rectangular in shape as shown; and preferably is formed of substantially rigid material, such as metal, as are most of the parts except the gasket sleeve. Base plate 17 is provided with a central hole 18, which slidably receives portion 14 of nipple tube 10 to seat against the abutment rib 16. Base plate 17 is also provided on diametrically opposite sides thereof with laterally-extending pivot pins 19, 19.

A cam lever 20 is provided in bifurcated form having a pair of laterally-spaced cam portions 21, 21 extending from a thumb piece 22. Each cam portion 21 has a bearing hole 23 extending therethrough adapted to receive one of the pivot pins 19 on base plate 17. Lever 20 is readily assembled upon base plate 17 by springing its resilient cam portions 21, 21 apart sufficiently to receive therebetween the base plate with its laterally-extending pivot pins 19, 19, so that the latter may be snapped into the bearing holes 23, 23 when the parts are permitted to assume the relative positions indicated in Fig. 6. The cam lever 20 preferably has each of its cam portions 21 terminating in substantially flat end faces 24, 24 for a purpose to be explained later.

A sliding abutment plate 25 has a central portion 26 which is substantially rectangular in shape and centrally apertured at 27 slidably to receive therethrough portion 14 of nipple tube 10. Each of the four sides of the substantially rectangular central portion 26 of abutment plate 25 is extended to provide flanges 28, 28, 29 and 30, each bent backwardly substantially normal to the plane of the central portion, and of a length sufficient to extend back beyond base plate 17 and the pivotal mounts of lever cams 21, 21, regardless of the positions of the latter. When lever 20 is in both its freeing position, as indicated in Figs. 5 and 6, or its anchoring position, as indicated in Figs. 1, 2 and 3, the inner faces of the two diametrically-opposed guard flanges 28, 28 are spaced apart a sufficient distance readily to accommodate therebetween cam portions 21, 21 of the cam lever 20, while flanking the outer ends of the pivot pins 19, 19, so as to securely hold those cam portions of the lever pivotally mounted upon base plate 17. In other words, the lever cams 21, 21 and base plate 17 are housed in the flange structure of sliding abutment plate 25 to hold them in their relative assembled positions. It will be noted from Fig. 6 that flange 30 is of relatively less width than the others so as to provide between edges thereof and edges of opposed flanges 28, 28 corner slots 31, 31 through which the cam portions 21, 21 of cam lever 20 extend and in which they may swing.

The central portion 26 of sliding abutment plate 25 may serve as the pressure applying face for swelling the gasket means, provided substantially all of the end face of the latter can be seated on the face of that central portion. This is particularly illustrated in Fig. 1 wherein a cylindrical gasket sleeve 32, preferably of rubber or the like, is shown, having its bottom or inner end 33 seated upon central portion 26 of sliding abutment plate 25. Upon the top or outer end 34 of gasket sleeve 32, a circular metallic washer 35 is preferably seated and held in position by an internally threaded nut 36, with the latter engaged upon threads 15 of outer end portion 14 of nipple tube 10.

Accordingly, with cylindrical gasket sleeve 32 located between sliding abutment plate portion 26 and washer 35, and with all of the parts held together by nut 36, minimum or no compressive force on the gasket sleeve is had when the cam lever 20 is manipulated to extend laterally from the side of the device in the position shown in Fig. 5 and indicated in dot-dash lines in Fig. 1. If, now, gasket sleeve 32 be placed within a circular outlet of a faucet, such as that indicated in dotted lines at 37 in Fig. 1, and cam lever 20 rotated downwardly from the dot-dash position to the full line position indicated in that figure, the cam portions 21, 21 of the cam lever will be caused to pivot about base plate pivot pins 19, 19 to raise the sliding abutment plate 25, thus foreshortening the distance between the latter and the fixed abutment means provided by washer 35 and nut 36. As a result, gasket sleeve 32 is compressed longitudinally to increase its diameter, thereby jamming it into secure anchoring contact with the inner wall of the faucet outlet to anchor hose 12 thereto. In such anchored position, cam lever 20 readily remains in the full line position shown in Fig. 1 by virtue of the fact that the flat end surfaces 24, 24 of cam portions 21, 21 are engaged with the flat undersurface of the sliding abutment plate 25.

Many bathroom fittings, such as faucets, are being supplied in shapes designed to enhance their ornamental effects, frequently resulting in formation of their outlet holes in shapes other than circular. The present hose attaching device is readily adapted to any such fixture having an odd-shaped outlet by substituting thereon for the cylindrical gasket sleeve 32 one of the set of gasket sleeves, now being supplied with the device, which is more nearly shaped in plan complementary to the cross-sectional shape of the outlet. For example, as will be noted from Figs. 2 and 3, the faucet end indicated in dotted lines 38 has an outlet oval in cross-section. Accordingly, the hose attaching device will be provided with an oval base washer 39, upon which is seated a gasket sleeve 132, the ends 133 and 134 of which are also oval in shape. Oval washer 135, similar to oval base washer 39, will be substituted for circular top washer 35. It will be more readily understood from Fig. 5 that as the cam lever 20 is rotated downwardly from its full line position shown therein, cam portions 21, 21 will each be swung up to the dot-dash position shown at 121 to lift sliding abutment plate 25 and oval base washer 39, thereby squeezing between the latter and top oval washer 135 the oval gasket sleeve 132 to swell it out to the dot-dash position indicated at 232 so as to cause it securely to engage the inner walls of the oval outlet of faucet 38, as indicated in full and dotted lines in Figs. 2 and 3.

Regardless of the shape of the gasket sleeve, whether it be cylindrical such as at 32, or oval such as at 132, the lateral dimensions thereof may be initially adjusted by turning down the nut 36 so that some compressive force is applied before the cam lever 20 is swung down to locking position. This feature of adjustability is made possible by the particular construction of the device.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A hose attaching device comprising, in combination, a nipple tube having one end provided with a fixed end abutment means and a sliding abutment means with an expansible gasket sleeve mounted therebetween about said tube, a base plate mounted on said tube in a relatively fixed position and having diametrically opposed pivot pins the end of each which is of certain size, a bifurcated cam lever having laterally spaced cam elements mounted on opposite sides of said tube behind said sliding abutment means with each cam element provided with a bearing hole larger than the end of one of said pivot pins removably to receive the same for rotatable support thereby, and guard means mounted on said sliding abutment means at opposite sides thereof and located laterally beyond the outer ends of said pivot pins but sufficiently close thereto as to prevent lateral removal of said cam elements off from said pins.

2. The hose attaching device as defined in claim 1 characterized by the provision of additional abutment means on said nipple tube holding said base plate in its position with said fixed end abutment means comprising a nut threadably mounted on said tube, all of the other recited elements being slidably received on said tube therebetween with said nut constituting the means of holding the parts together.

3. The hose attaching device as defined in claim 1 characterized by the provision of said guard means as a plate slidably mounted behind said gasket sleeve having side flanges extending rearwardly to flank and cover the ends of said pivot pins when all parts are assembled together.

4. The hose attaching device as defined in claim 3 characterized by the provision of said guard plate with a central portion having a hole slidably receiving said nipple tube, and with a pair of flanges on diametrically opposite sides of said central portion extending back away therefrom substantially normal thereto and of sufficient length completely to cover the ends of said pivot pins in any operative position of said lever.

5. The hose attaching device as defined in claim 4 characterized by the provision of said gasket sleeve having a shape in plan substantially complementary to the shape of the fixture hole in which it is to be anchored and rigid plates on opposite sides of said sleeve with at least one of the latter similarly shaped in plan.

6. A hose attaching device comprising, in combination, a nipple tube having one end externally threaded, a nut threadably engaged thereon to provide a relatively fixed abutment, a sliding abutment plate having a hole therein slidably receiving said tube, an expansible gasket sleeve mounted about said tube between said nut and plate, fixed abutment means mounted on said tube back of said plate, a base plate having a hole therein slidably receiving said tube and resting against the front side of said fixed abutment means, a pair of diametrically opposed pivot pins extending laterally from opposite sides of said base plate, a bifurcated cam lever having laterally spaced cam elements mounted on opposite sides of said tube behind said sliding abutment plate with each cam element provided with a bearing hole rotatably receiving one of said pivot pins, and a pair of guard flanges on opposite sides of said sliding abutment plate extending back away therefrom and substantially normal thereto while flanking the outer ends of said pivot pins in all operative positions of said lever sufficiently close as to prevent lateral removal of said cam elements off from said pins when the parts of the device are assembled together.

CHARLES L. HYSER.

REFERENCES CITED

The following references are of record in the file of this patent:

UNITED STATES PATENTS

| Number | Name | Date |
|---|---|---|
| 2,152,429 | Cave | Mar. 28, 1939 |